United States Patent
Yi

(10) Patent No.: US 10,807,756 B2
(45) Date of Patent: Oct. 20, 2020

(54) APPARATUS OF AUTOMATICALLY SUPPLYING BLOOD COLLECTION TUBES FOR A LABELING MACHINE

(71) Applicant: Credoway Co., Ltd., Seoul (KR)

(72) Inventor: Sang Ho Yi, Seoul (KR)

(73) Assignee: Sang Ho Yi, Seoul (KR)

( * ) Notice: Subject to any disclaimer, the term of this patent is extended or adjusted under 35 U.S.C. 154(b) by 349 days.

(21) Appl. No.: 15/772,820

(22) PCT Filed: Dec. 8, 2017

(86) PCT No.: PCT/KR2017/014368
§ 371 (c)(1),
(2) Date: May 2, 2018

(87) PCT Pub. No.: WO2018/236014
PCT Pub. Date: Dec. 27, 2018

(65) Prior Publication Data
US 2020/0299019 A1 Sep. 24, 2020

(30) Foreign Application Priority Data
Jun. 21, 2017 (KR) .......... 10-2017-0078292

(51) Int. Cl.
*B65C 9/02* (2006.01)
*B65C 9/40* (2006.01)
(Continued)

(52) U.S. Cl.
CPC .............. *B65C 9/02* (2013.01); *B01L 3/5082* (2013.01); *B65C 3/06* (2013.01); *B65C 9/40* (2013.01);
(Continued)

(58) Field of Classification Search
CPC .. G01N 2035/0406; G01N 35/04; B65C 9/06; B65C 3/06; B65C 9/40; B01L 3/5082; G07F 11/64
(Continued)

(56) References Cited

U.S. PATENT DOCUMENTS

| 4,310,097 A * | 1/1982 | Merl ................. A47F 7/285 211/59.2 |
| 5,788,091 A * | 8/1998 | Robertson ............ A47F 7/285 211/59.2 |

(Continued)

FOREIGN PATENT DOCUMENTS

| JP | 4321789 B2 | 8/2009 |
| KR | 10-0866410 B1 | 10/2008 |

(Continued)

OTHER PUBLICATIONS

International Search Report for PCT/KR2017/014368 dated Apr. 12, 2018.

*Primary Examiner* — Timothy R Waggoner

(57) ABSTRACT

Provided is an apparatus of automatically supplying blood collection tubes for a labeling machine, includes: a holding unit including a plurality of holding grooves in which a plurality of blood collection tubes are inserted and supported; a discharge unit configured to supply the blood collection tubes to the labeling machine; a supply unit having supply pins and configured to maintain or release positions of the blood collection tubes to be transferred to the discharge unit; a standby unit having stop pins and configured to control movements of blood collection tubes positioned next to the foremost blood collection tubes held by the supply unit; an operation unit configured to select a type and the number of blood collection tubes; and a controller configured to receive signals from the operation
(Continued)

unit and control the supply unit and the standby unit, thus to transfer the blood collection tubes to the discharge unit.

10 Claims, 8 Drawing Sheets

(51) Int. Cl.
*B65G 1/08* (2006.01)
*B01L 3/00* (2006.01)
*B65C 3/06* (2006.01)

(52) U.S. Cl.
CPC ........ *B65G 1/08* (2013.01); *B65G 2201/0235* (2013.01)

(58) Field of Classification Search
USPC ........... 221/251; 700/231–244; 156/566, 362
See application file for complete search history.

(56) References Cited

U.S. PATENT DOCUMENTS

| | | | |
|---|---|---|---|
| 5,893,263 A * | 4/1999 | Matsumoto | B01L 3/5453 156/384 |
| 8,276,632 B2 | 10/2012 | Kim et al. | |
| 9,315,286 B2 * | 4/2016 | Hanna | B65C 9/42 |
| 2002/0066744 A1 * | 6/2002 | Trulaske, Sr. | A47F 7/285 221/295 |
| 2004/0159589 A1 * | 8/2004 | Matsumoto | G01N 35/1079 209/546 |
| 2010/0252203 A1 | 10/2010 | Kim et al. | |
| 2011/0173927 A1 * | 7/2011 | Yamada | B65G 35/02 53/236 |
| 2012/0074162 A1 | 3/2012 | Takahashi | |
| 2015/0197362 A1 * | 7/2015 | Sato | B65C 9/30 156/363 |

FOREIGN PATENT DOCUMENTS

| | | |
|---|---|---|
| KR | 10-2010-0093987 A | 8/2010 |
| KR | 10-2012-0027376 A | 3/2012 |
| KR | 10-2014-0055107 A | 8/2014 |

* cited by examiner

APPARATUS OF AUTOMATICALLY SUPPLYING BLOOD COLLECTION TUBES FOR A LABELING MACHINE

CROSS-REFERENCE TO RELATED APPLICATIONS

This application claims priority to Korean Patent Application No. 10-2017-0078292, filed on Jun. 21, 2017, which is incorporated herein by reference in its entirety. Further, this application is the National Phase application of International Application No. PCT/KR2017/014368, filed Dec. 8, 2017, which designates the United States and was published in English. Each of these applications is hereby incorporated by reference in their entirety into the present application

BACKGROUND

1. Field

The present disclosure relates to an automatic supplying apparatus, and more particularly, to an apparatus of automatically supplying blood collection tubes for a labeling machine, which may hold and transfer a plurality of blood collection tubes, and efficiently supply the same to a labeling machine, thus to prevent and minimize malfunction, and improve work efficiency with reduced cost.

2. Description of the Related Art

Generally, as techniques of clinical experiments are rapidly advancing, blood tests including serum biochemical tests, serum immunological tests, blood cell tests and the like are being extensively performed, thereby contributing greatly to the prevention of diseases and early stage diagnosis.

Regardless of its subject and type, a certain amount of blood is collected at the time of a blood test, and the collected blood is stored in a blood collection tube, which is a special container to be used during storage, transportation and processing the same.

In the case of blood collection tubes containing each blood sample, information on the individual and the blood test is printed on a label, and the label containing the information is attached on the surface of the blood collection tube, in order to prevent medical incidents caused by replacing the blood sample with another person's.

Usually, however, the operator prints the information of the individual and the blood test on the label by using a printer, and attaches the printed label to the surface of the blood collection tube manually. Accordingly, mistakes such as inadvertently attaching a label on another person's blood collection tube frequently occur during busy work.

Accordingly, developing a technique that can simplify the labeling process and prevent the error in labeling the blood collection tube is needed.

SUMMARY

In consideration of the above-mentioned circumstances, it is an object of the present disclosure to provide an automatically supplying blood collection tubes for a labeling machine, which includes: a holding unit including a plurality of holding grooves in which a plurality of blood collection tubes are inserted and supported; a discharge unit configured to supply the blood collection tubes which are moved through supply holes formed at front ends of the holding grooves of the holding unit to the labeling machine; a supply unit having supply pins and configured to maintain positions of the blood collection tubes held at a forefront of each holding groove or release the stationary blood collection tubes, thus to selectively transfer the blood collection tube to the discharge unit; a standby unit having stop pins inserted into openings of the blood collection tubes and configured to control movements of blood collection tubes positioned next to the foremost blood collection tubes held by the supply unit; an operation unit configured to select a type and the number of blood collection tubes held in the holding unit at the time of operation; and a controller configured to receive a signal from the operation unit and control the supply unit and the standby unit, thus to sequentially transfer one or more blood collection tubes requiring labeling to the discharge unit, thereby it is possible to sequentially and easily supplying the blood collection tubes as necessary, and thus to reduce costs and improve work efficiency.

To achieve the above-described object, according to one aspect of the present disclosure, there is provided an automatically supplying blood collection tubes for a labeling machine, wherein the blood collection tube may include: a transparent body in which collected blood is accommodated; a cover which has a diameter larger than that of the body and includes an opening formed in a central portion thereof; and a plug made of an elastic material, which is disposed between the body and the cover so as to be exposed through the opening and close the body, and the apparatus is configured to supply a plurality of blood collection tubes having various sizes due to the covers having different heights to the labeling machine, the apparatus including: a holding unit including a plurality of holding grooves in which the body of each blood collection tube is inserted and a lower end of the cover is supported, and supply grooves formed at front ends of the holding grooves in a size to allow the cover of the blood collection tube to pass therethrough, wherein an upper portion of the holding unit is formed to be inclined downward from a rear toward a front, such that the blood collection tubes held in the holding grooves are moved forward by their own weight; a discharge unit configured to supply the blood collection tubes which are moved through the supply holes formed at the front ends of the holding grooves of the holding unit to the labeling machine; a supply unit having supply pins and configured to maintain positions of the blood collection tubes held at a forefront of each holding groove or release the stationary blood collection tubes, thus to selectively transfer the blood collection tube to the discharge unit; a standby unit having stop pins inserted into the openings of the blood collection tubes and configured to control movements of blood collection tubes positioned next to the foremost blood collection tubes held by the supply unit; an operation unit configured to select a type and the number of blood collection tubes held in the holding unit at the time of operation; and a controller configured to receive a signal from the operation unit and control the supply unit and the standby unit, thus to sequentially transfer one or more blood collection tubes requiring labeling to the discharge unit.

Further, the holding unit includes: a plurality of holding grooves formed at a constant interval; a holding plate inclined downward from a rear toward a front; a pair of holding frames configured to hold both sides of the holding plate; and supply holes formed at a front end of each holding groove so as to allow the cover of the blood collection tube to pass therethrough.

In addition, the label machine may include both side plates disposed at an interval and an upper plate slidably mounted on upper portions of the side plates so as to open and close an inside thereof, andthe holding unit may be mounted on the upper plate of the label machine to slide therewith, so as to prevent a front end portion thereof having the discharge unit, the supply unit, and the standby unit mounted thereon from being removed from the labeling machine.

Further, the supply unit may include: a supply frame; the supply pin installed in the supply frame so as to be moved toward the supply hole of the holding unit or away therefrom; a first supply actuator configured to move the supply pin toward the supply hole of the holding unit; and a second supply actuator provided in the supply frame to move the supply pin away from the supply hole of the holding unit, wherein the supply pin may be moved toward the supply hole by the first supply actuator to prevent the blood collection tube held at the forefront of the holding groove from being moved to the supply hole, and the supply pin may be moved away from the supply hole by the second supply actuator to allow the blood collection tube held at the forefront of the holding groove to be moved to the discharge unit through the supply hole.

Further, the standby unit may include: a standby frame; a standby pin provided in the standby frame so as to be inserted into an opening formed in a cover of a blood collection tube positioned next to the foremost blood collection tube of the holding groove, thus to limit a movement thereof; a first standby actuator configured to move the standby pin toward the holding groove of the holding unit; and a second standby actuator provided in the standby frame to move the standby pin away from the holding groove of the holding unit, wherein the standby pin may be moved toward the holding groove first standby actuator to be inserted into the opening of the cover of the blood collection tube positioned next to the foremost blood collection tube of the holding groove, thus to limit a movement thereof, and the standby pin may be moved away from the holding groove by the second standby actuator to allow the blood collection tube positioned next to the foremost blood collection tube of the holding groove to be moved to the forefront of the holding groove.

Further, each of the second supply actuator and the second standby actuator may include: a solenoid disposed in the frame with an inner space formed therein and having coils wound around an outer periphery thereof to form a magnetic field by power applied to the coil; a drive rod which is located in the inner space of the solenoid so that a lower end portion thereof is connected to an upper end portion of the pin and an upper end portion thereof protrudes to an upper side of the frame, and is moved upward by the magnetic field to move the pin upward; and a second stopper provided in the frame to limit a moving distance of the pin moved along the drive rod.

Further, each of the first supply actuator and the first standby actuator may include: a first flange extending form an outer periphery of the pin protruding outwardly below the frame; a first spring having elasticity and provided between the first flange and the frame to press the first flange downward, so as to move the pin downward; and a first stopper provided at an upper end of the drive rod so as to limit a moving distance of the pin moved by the first spring.

The controller may be configured to continuously and repeatedly perform the steps of: controlling the first supply actuator so that the supply pin holds a plurality of blood collection tubes in the holding grooves with a part of the supply hole being covered by the supply pin; operating the first standby actuator so that the standby pin is inserted into the opening of the cover of the blood collection tube positioned next to the foremost blood collection tube to limit a movement thereof; controlling the second supply actuator to move the supply pin upward so as to open the supply hole; after the foremost blood collection tube is supplied to the discharge unit, operating the first supply actuator so that a part of the supply hole is again covered by the supply pin; controlling the second standby actuator to move the standby pin upward so that the blood collection tube moves to the forefront of the holding groove while interrupting the movement of the blood collection tube by the supply pin; and controlling the first standby actuator so that the standby pin is inserted into the opening of the cover of the blood collection tube which has been moved together during moving the blood collection tube to the forefront of the holding groove so as to limit a movement thereof.

Further, each pin may include: a pin body having an insertion hole therein, an upper end portion connected to the drive rod, and the first flange formed on the outer periphery thereof; and a pin tip portion located in the insertion hole of the pin body. In addition, the pin may be a cylindrical shape having the same diameter across an entire length thereof, or a tapered shape whose diameter is gradually decreased toward a lower side.

Each of the supply unit and the standby unit may further include a micro adjuster configured to adjust a protruding length of the pin depending on the height of the cover of the blood collection tube.

Further, the micro adjuster may include any one of a cylinder and a motor provided on the pin body to move the pin.

Also, the standby pin may be vertically moved up and down, and the supply pin may be moved up and down in a state inclined toward a rear lower side.

The operation unit may be a touch screen.

Further, the discharge unit may include: a discharge space formed therein; discharge frames provided at one end portion of each holding frame: a discharge hole formed at a center of a bottom of the discharge space for transferring the blood collection tube to the labeling machine; and a pair of guide blocks provided on both sides of the discharge hole to guide the blood collection tube supplied by the supply unit to the discharge hole.

The discharge frame may include: a pair of discharge panels respectively formed at one end portions of the pair of holding frames to form the discharge space therein; a discharge door provided between the pair of discharge panels to open and close the discharge space forward; and door latches configured to lock the discharge door to the pair of discharge panels.

Further, the discharge door is made of a transparent material, such that it is possible to see the discharge space from an outside.

Further, the door latch may include: a latch protrusion protruding from a front surface of each guide block; a through hole formed in the discharge door so as to pass the latch protrusion therethrough; and a latch hole configured to latch the discharge protrusion passing through the through hole so as to lock the discharge door to the pair of discharge panels.

Furthermore, the discharge frame may include a second supply hole configured to manually supply a medical sample tube.

According to the automatically supplying blood collection tubes for a labeling machine having the above-described configuration of the present invention, the blood collection tube for labeling may be easily and sequentially supplied as necessary, thereby reducing the costs compared with the prior art, and improving work efficiency.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, various embodiments according to the present invention will be described in detail with reference to the accompanying drawings. The detailed description to be described below with reference to the accompanying drawings is intended to illustrate exemplary embodiments of the invention and is not intended to represent the only embodiment in which the invention may be executed. The following detailed description includes specific details in order to provide a complete understanding of the present invention. However, those skilled in the art will appreciate that the present invention may be executed without these specific details.

In some cases, well-known structures and devices will not be described or will be illustrated in a block diagram form centering on core functions of each structure and apparatus, to avoid obscuring concepts of the present invention.

In the specification, when the explanatory phrase a part "comprises or includes" a component is used, this means that the part may further include the component without excluding other components, so long as special explanation is not given. Further, the term " . . . unit" described in the specification means a unit for processing at least one function or operation. In addition, as used herein the context for describing the present invention (particularly, in the context of the following claims), the singular forms "a," "an," "one" and "the" are intended to include the plural forms as well, unless the context clearly indicates otherwise in the specification or is clearly limited by the context.

In description of various embodiments of the present invention, the publicly known functions and configurations that are judged to be able to make the purport of the present invention unnecessarily obscure will not be described in detail. Further, wordings to be described below are defined in consideration of the functions of the present invention, and may differ depending on the intentions of a user or an operator or custom. Accordingly, such wordings should be defined on the basis of the contents of the overall specification.

Hereinafter, various embodiments of the present invention will be described with reference to the accompanying drawings.

Figure 1:
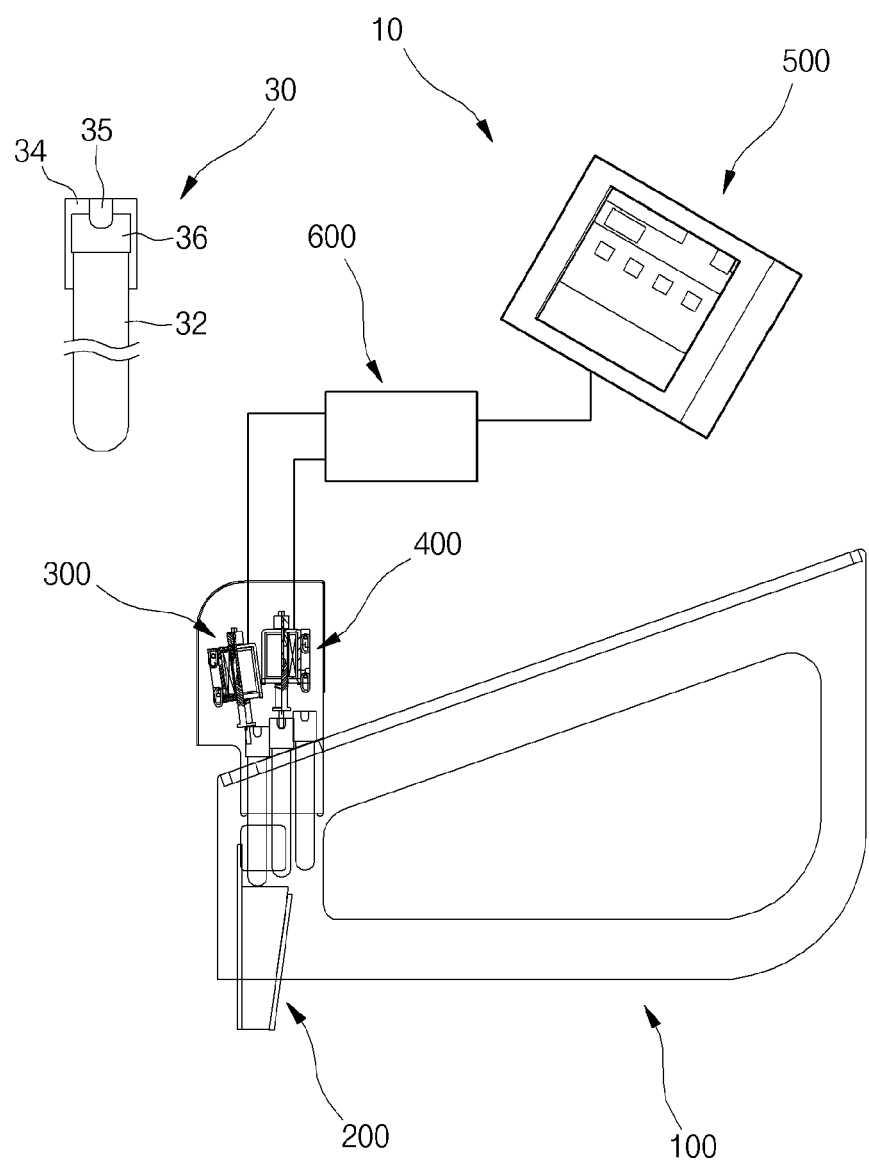
FIG. 1 is a view illustrating a blood collection tube supplying apparatus according to one exemplary embodiment of the present invention.
Figure 2:
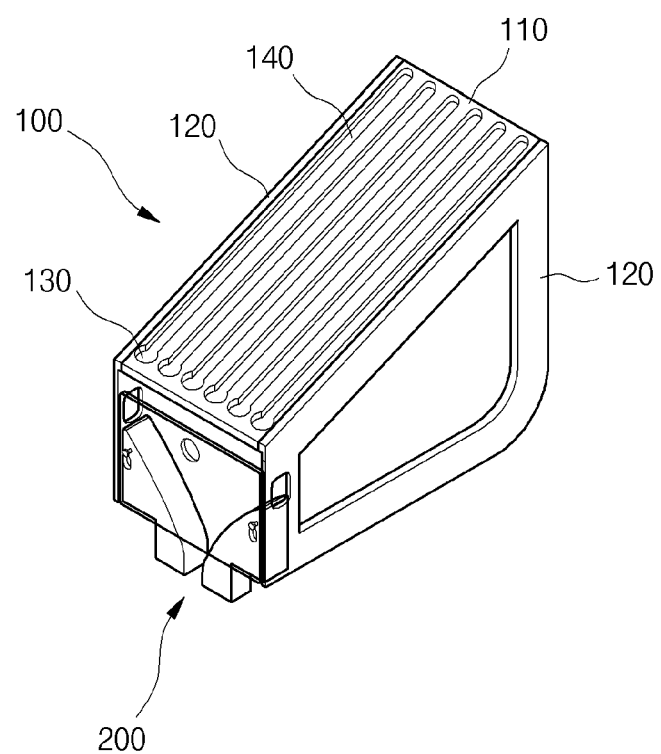
FIG. 2 is a perspective view illustrating a holding unit of the blood collection tube supplying apparatus according to one exemplary embodiment of the present invention.
Figure 3:
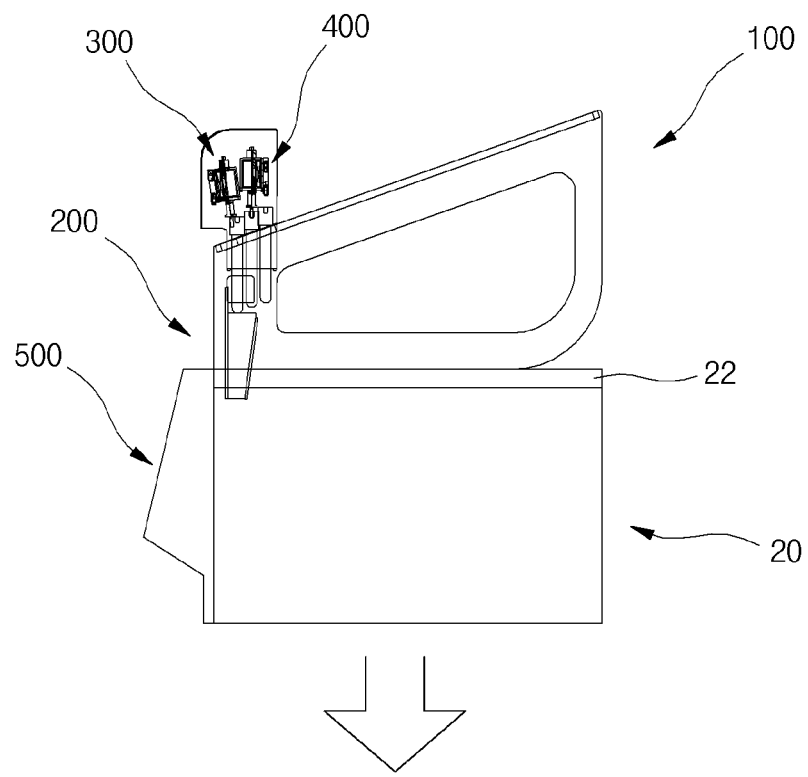
FIG. 3 is a view illustrating an installation state of a holding unit according to one exemplary embodiment of the present invention.
Figure 3:
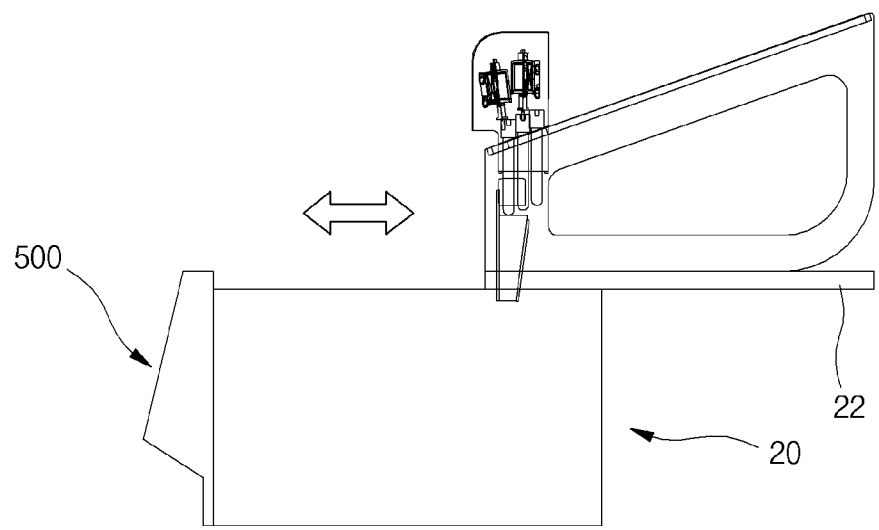
Figure 4:
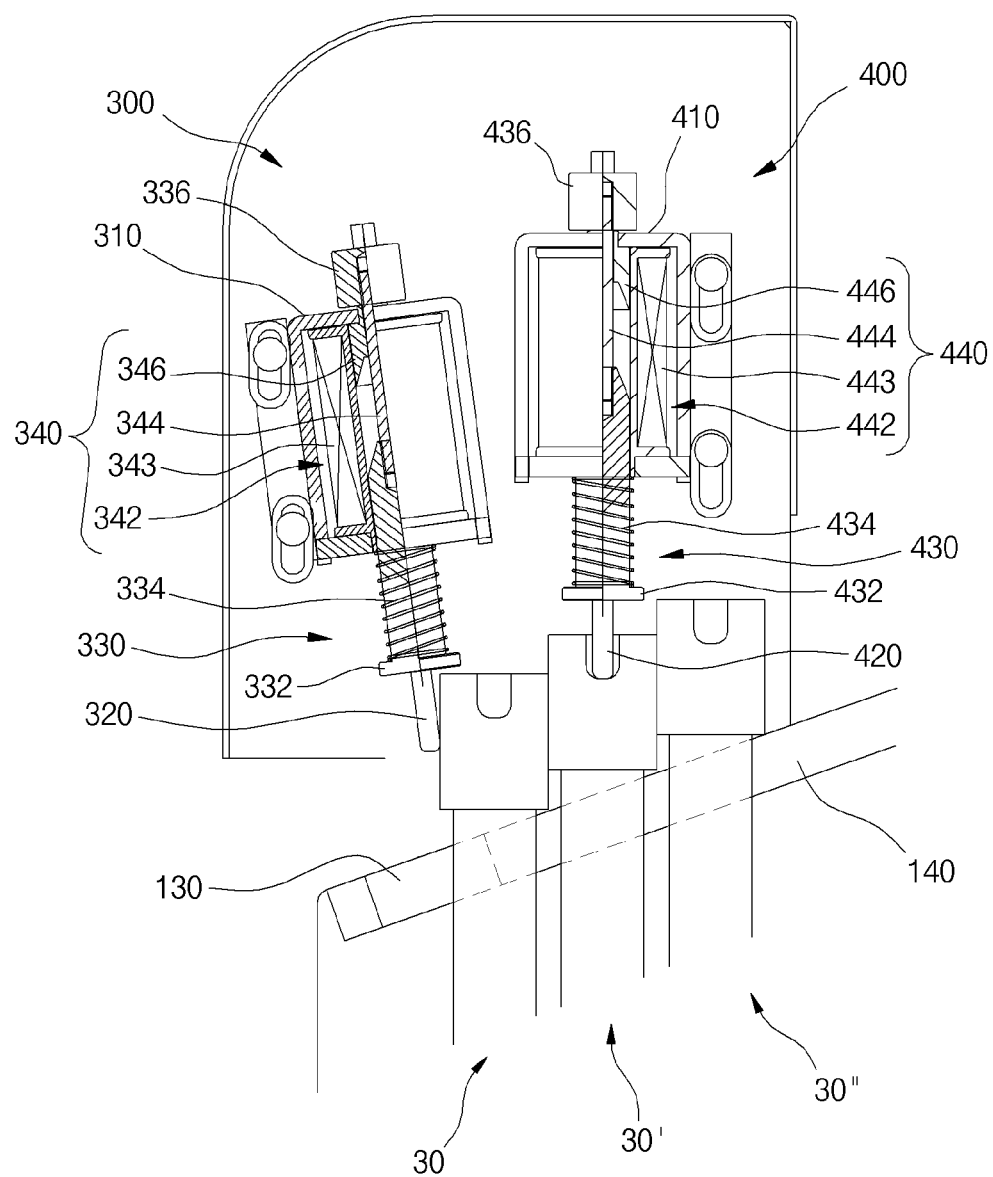
FIG. 4 is a view illustrating a supply unit and a standby unit according to one exemplary embodiment of the present invention.
Figure 5:
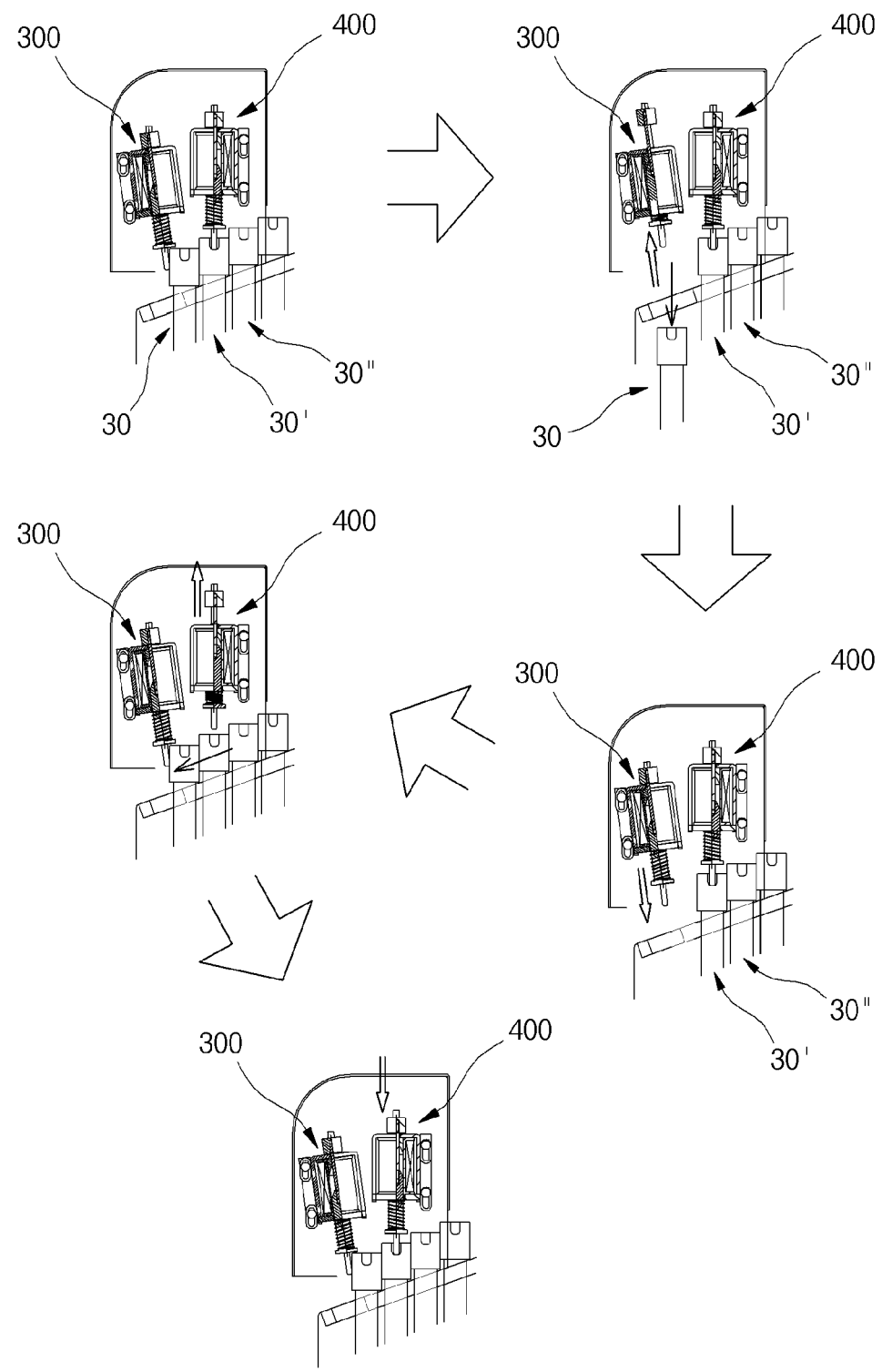
FIG. 5 is a view illustrating an operating state by a controller according to one exemplary embodiment of the present invention.
Figure 6:
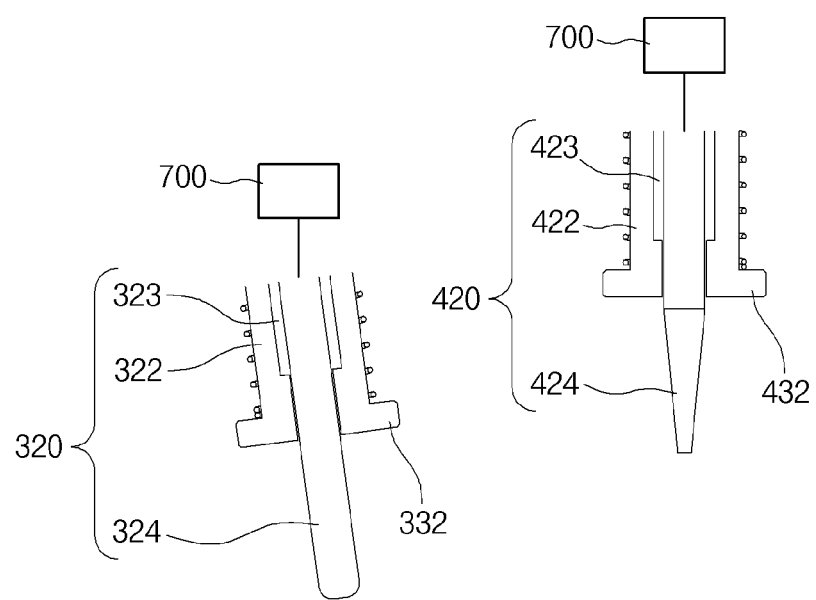
FIG. 6 is a view illustrating a supply pin and a standby pin according to one exemplary embodiment of the present invention.
Figure 7:
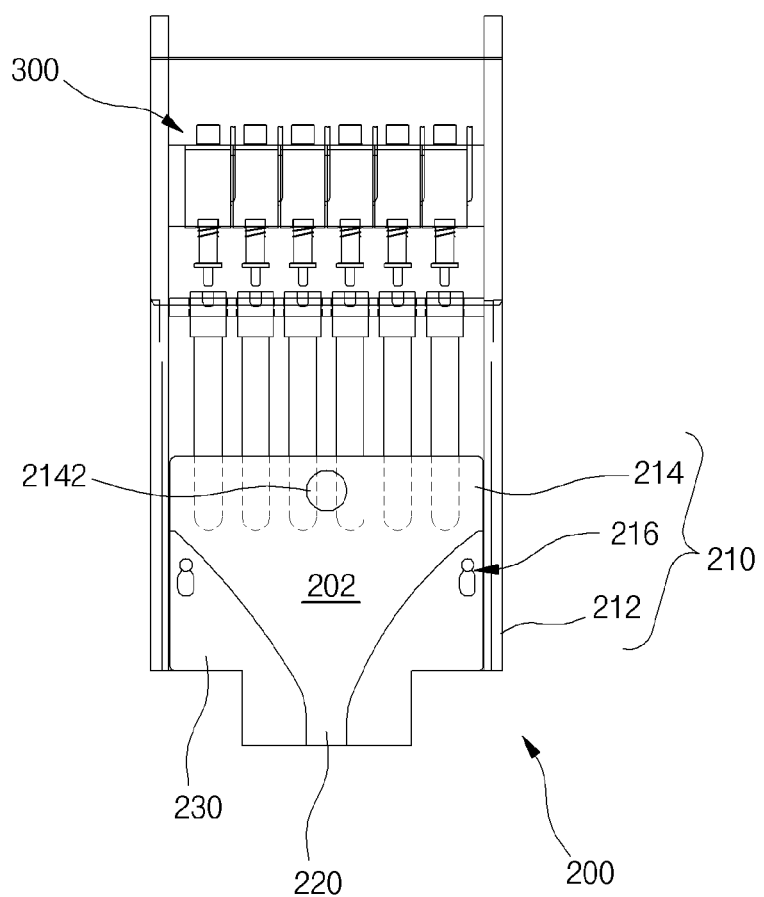
FIG. 7 is a view illustrating a discharge unit according to one exemplary embodiment of the present invention.
Figure 8:
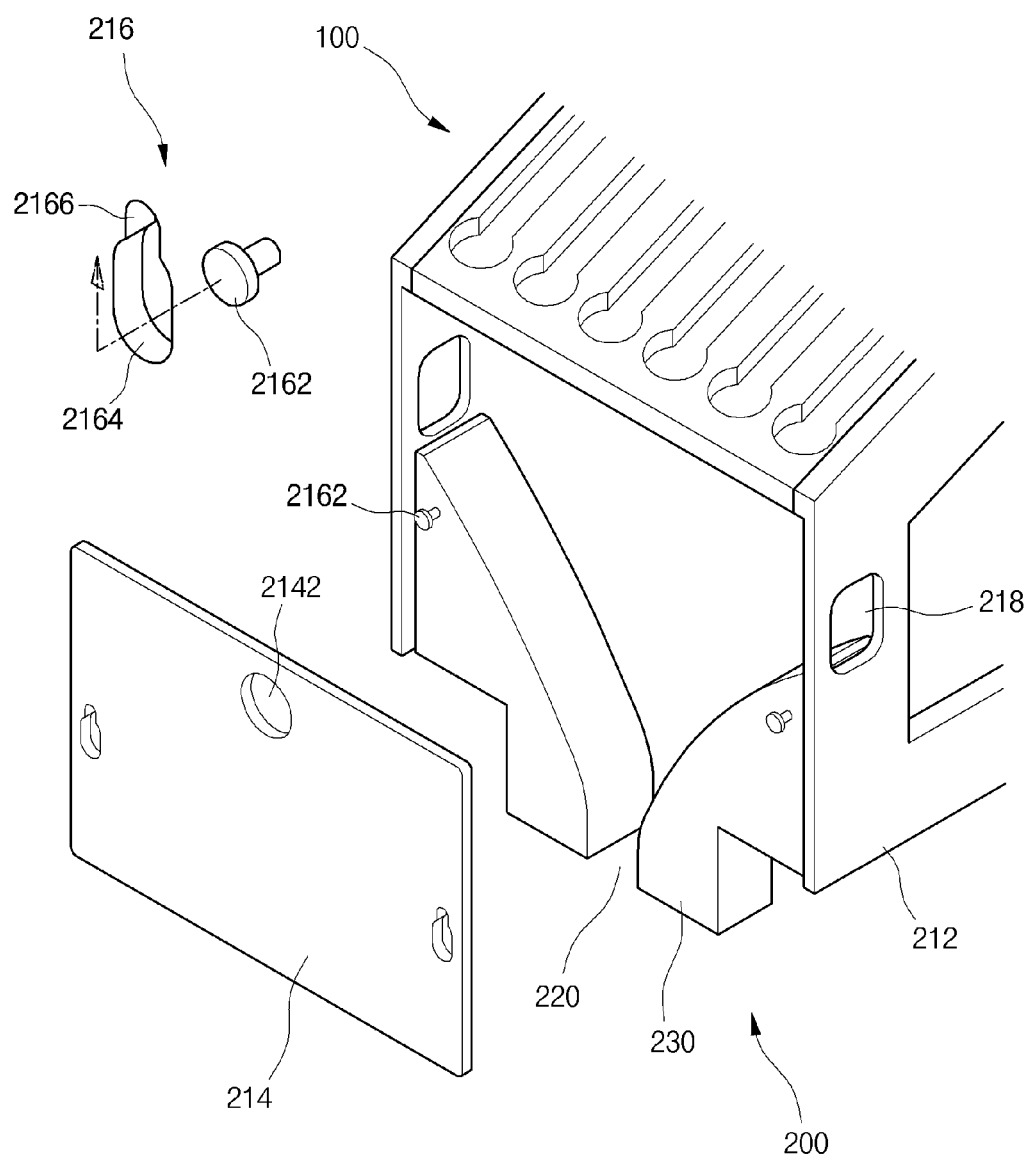
FIG. 8 is a perspective view illustrating a discharge frame according to one exemplary embodiment of the present invention.

FIG. 1 is a view illustrating a blood collection tube supplying apparatus according to one exemplary embodiment of the present invention, and FIG. 2 is a perspective view illustrating a holding unit of the blood collection tube supplying apparatus according to one exemplary embodiment of the present invention. In addition, FIG. 3 is a view illustrating an installation state of a holding unit according to one exemplary embodiment of the present invention, and FIG. 4 is a view illustrating a supply unit and a standby unit according to one exemplary embodiment of the present invention. Further, FIG. 5 is a view illustrating an operating state by a controller according to one exemplary embodiment of the present invention, and FIG. 6 is a view illustrating a supply pin and a standby pin according to one exemplary embodiment of the present invention. In addition, FIG. 7 is a view illustrating a discharge unit according to one exemplary embodiment of the present invention, and FIG. 8 is a perspective view illustrating a discharge frame according to one exemplary embodiment of the present invention.

As illustrated in the drawings, an apparatus 10 of automatically supplying blood collection tubes for a labeling machine according to one exemplary embodiment of the present invention may include a holding unit 100, a discharge unit 200, a supply unit 300, a standby unit 400, an operation unit 500 and a controller 600.

Herein, the blood collection tube 30 may include a body 32, a cover 34, and a plug 36.

The body 32 made of a transparent material is configured to accommodate collected blood. The cover 34 has a diameter larger than that of the body 32, and includes an opening 35 formed in a central portion thereof.

The plug 36 made of an elastic material is disposed between the body 32 and the cover 34 to be exposed to an outside through the opening 35 of the cover 34 so as to close the body 32.

The blood collection tube 30 is formed in different sizes depending on types thereof. The type of each blood collection tube 30 refers to each blood collection tube that is separately prepared for each test such as for red blood cells, white blood cells, and platelets.

Each of the blood collection tubes 30 is formed so that a height of the cover 34 and a length of the body 32 are different for each size.

Instead, the cover 34 of the blood collection tube 30 having each size has the same or similar formed diameter. Each body 32 is located in a holding groove 140 of the holding unit 100, and each cover 34 is supported by an upper portion of the holding unit 100 between the holding grooves 140.

In detail, as illustrated in FIG. 2, the holding unit 100 includes a plurality of holding grooves 140 in which the body 32 of each blood collection tube 30 is inserted with a lower end of the cover 34 being supported, and supply holes 130 having a diameter for allowing the cover 340 of the blood collection tube 30 to pass therethrough.

The upper portion of the holding unit 100 is formed so as to be inclined downward from a rear toward a front, and the blood collection tubes 30 held in the holding grooves 140 are moved forward by their own weight.

In addition, the discharge unit 200 is provided to supply the blood collection tube 30 discharged through the front end of the holding unit 100 to a labeling machine 20.

The supply unit 300 has supply pins 310 and is provided to maintain positions of the blood collection tubes 30 held at the forefront of each holding groove 140 or release the stationary blood collection tubes 30, thus to selectively transfer the blood collection tube 30 to the discharge unit 200.

Further, the standby unit 400 has stop pins 410 inserted into the openings 35 of the blood collection tubes 30 and is provided to control movements of the blood collection tubes 30 positioned next to the foremost blood collection tubes 30 held by the supply pins 310 of the supply unit 300.

The operation unit 500 is provided to select the type and the number of the blood collection tubes 30 held in the holding unit 100 at the time of operation.

In addition, the controller 600 is configured to receive a signal from the operation unit 500 and control the supply unit 300 and the standby unit 400, thus to sequentially transfer one or more blood collection tubes 30 requiring labeling to the discharge unit 200.

To this end, the holding unit 100 includes a holding plate 110, holding frames 120, and the supply holes 130.

The holding plate 110 has the plurality of holding grooves 140 formed at a constant interval and is inclined downwardly from the rear toward the front.

Further, a pair of holding frames 120 spaced apart from each other are provided to hold both sides of the holding plate 110 with being inclined.

The supply holes 130 are formed at the front ends of the holding grooves 140, respectively, and have a diameter sufficient for the covers 34 of the blood collection tubes 30 to pass therethrough.

Herein, as illustrated in FIG. 3, the label machine 20 includes both side plates disposed at an interval and an upper plate 22 slidably mounted on upper portions of the side plates so as to open and close an inside thereof.

Preferably, the holding unit 100 is mounted on the upper plate 22 of the label machine 20 to slide therewith, so that the front end portion thereof having the discharge unit 200, the supply unit 300, and the standby unit 400 mounted thereon is not removed from the labeling machine 20 to a rear side thereof, thus to limit a sliding distance of the upper plate 22.

In addition, as illustrated in FIG. 4, the supply unit 300 includes a supply frame 310, the supply pin 320, a first supply actuator 330, and a second supply actuator 340.

The supply pin 320 is installed in the supply frame 310 so as to be moved toward the supply hole 130 of the holding unit 100 or away therefrom.

Further, the first supply actuator 330 is provided to move the supply pin 320 toward the supply hole 130 of the holding unit 100.

The second supply actuator 340 is provided in the supply frame 310 to move the supply pin 320 away from the supply hole 130.

Then, an operation of the supply unit 300 having the above-described configuration will be described. When moving the supply pin 320 toward the supply hole 130 of the holding unit 100 by the first supply actuator 330, the supply pin 320 contacts a front portion of the cover 34 to prevent the blood collection tube 30 held at the forefront of the holding groove 140 from being moved to the supply hole 130.

On the other hand, when moving the supply pin 320 away from the supply hole 130 by the second supply actuator 340, the supply pin 320 comes out of the opening of the cover 34 to allow the blood collection tube 130 held at the forefront of the holding groove 140 to be moved to the discharge unit 200 through the supply hole 130.

In addition, the standby unit 400 includes a standby frame 410, the standby pin 420, a first standby actuator 430, and a second standby actuator 440.

The standby pin 420 is provided in the standby frame 410 so as to be inserted into an opening formed in a cover of the blood collection tube 30' positioned next to the foremost blood collection tube 30 of the holding groove 140, thus to limit a movement thereof.

Further, the first standby actuator 430 is provided to move the standby pin 420 toward the holding groove 140 of the holding unit 100.

The second standby actuator 440 is provided in the standby frame 410 to move the standby pin 420 away from the holding groove 140 of the holding unit 100.

Next, an operation of the standby unit 400 will be described in more detail. When moving the standby pin 420 toward the holding groove 140 by the first standby actuator 430, the standby pin 420 is inserted into the opening of the blood collection tube 30' to limit a movement thereof.

On the other hand, when moving the standby pin 420 away from the holding groove 140 by the second standby actuator 440, the standby pin 420 comes out of the opening to allow the blood collection tube 30' to be moved to the forefront of the holding groove 140.

Herein, the second supply actuator 340 and the second standby actuator 440 include solenoids 342 and 442, drive rods 344 and 444, and second stoppers 346 and 446, respectively.

The solenoids 342 and 442 are provided in the frames 310 and 410, and have inner spaces formed therein, respectively. Coils 343 and 443 are wound around outer peripheries of the solenoids 342 and 442 to form a magnetic field by power applied to the coils 343 and 443.

Further, lower ends of the drive rods 344 and 444 disposed in the inner spaces of the solenoids 342 and 442 are connected to upper ends of the pins 320 and 420, and the upper ends thereof protrude above the frames 310 and 410, respectively. When moving the drive rods 344 and 444 upward due to the formed magnetic field, the pins 320 and 420 are moved upward, respectively.

The second stoppers 346 and 446 are provided in the frames 310 and 410 to limit moving distances of the pins 320 and 420 moved along the drive rods 344 and 444, respectively.

In addition, the first supply actuator 330 and the first standby actuator 430 include first flanges 332 and 432, first springs 334 and 434, and first stoppers 336 and 436, respectively.

The first flanges 332 and 432 extend from the outer peripheries of the pins 320 and 420 protruding outwardly below the frames 310 and 410, respectively.

Further, the first springs 334 and 434 have elasticity, and are provided between the first flanges 332 and 432 and the frames 310 and 410 to press the first flanges 332 and 432 downward, so as to move the pins 320 and 420 downward, respectively.

The first stoppers 336 and 436 are provided at the upper ends of the drive rods 344 and 444 so as to limit the moving distance of the pins 320 and 420 moved by the first springs 334 and 434, respectively.

The first supply actuator 330 and the first standby actuator 430, and the second supply actuator 340 and the second standby actuator 440 are controlled by the controller 600, respectively.

First, as illustrated in FIG. 5, the controller 600 controls the first supply actuator 330, then the supply pin 320 is moved downward to cover a part of the supply hole 130. In this state, when the blood collection tubes 30 slide along the inclined upper portion of the holding unit 100, the supply pin 320 contacts the front portion of the cover 34 of the foremost blood collection tube 30, so as to prevent the plurality of blood collection tubes 30 and 30' from being moved.

Next, the controller 600 operates the first standby actuator 430, then the standby pin 420 is moved toward the blood collection tube 30' positioned next to the foremost blood collection tube 30 to be inserted into the opening 35' thereof, so as to limit a movement thereof.

Then, in order to discharge the blood collection tube 30, according to an operation signal of the operation unit 500, the controller 600 controls the second supply actuator 340, then the supply pin 320 is moved away from the blood collection tube 30 to be separated therefrom, so as to allow the foremost blood collection tube 30 to be discharged through the supply hole 130 and transferred to the discharge unit 200.

Next, the controller 600 operates the first supply actuator 330, then the supply pin 320 is moved downward so as to cover a part of the supply hole 130 again. Thereafter, the controller 600 controls the second standby actuator 440, then the standby pin 420 is moved upward to come out of the opening 35. Thereby, the blood collection tube 30' is moved to the forefront of the holding groove 140, and the movement thereof is blocked by the supply pin 320 to be held at the forefront.

Thereafter, the controller 600 controls the first standby actuator 430, then the standby pin 420 is moved toward another blood collection tube 30" which has been moved together with the blood collection tube 30' moved to the forefront of the holding groove 140, to be inserted into the opening of the cover, so as to prevent the blood collection tube 30" from being moved downward.

After that, the above-described processes are continuously repeated.

Herein, each of the pins 320 and 420 includes pin bodies 322 and 422, and pin tip portions 324 and 424, respectively, as illustrated in FIG. 6.

The pin bodies 322 and 422 have insertion holes 323 and 423 therein, and upper end portions are connected to the drive rods 344 and 444, and the first flanges 332 and 432 are formed on the outer peripheries thereof, respectively.

Further, the pin tip portions 324 and 424 are located in the insertion holes 323 and 423 of the pin bodies 322 and 422, respectively.

Herein, the pin tip portions 324 and 424 may be a cylinder shape having the same diameter across an entire length thereof, or a tapered shape whose diameter is gradually decreased toward the lower side.

For example, the pin tip portion 324 of the supply unit 300 is formed in a cylindrical shape having the same diameter across an entire length thereof, so that the cover 34 of the foremost blood collection tube 30 is easily hooked to prevent from being discharged through the supply hole 130.

In accordance with one exemplary embodiment, the pin 424 of the standby unit 400 may be formed in a taper shape whose diameter is gradually decreased toward the lower side so as to be easily inserted into the opening 35' of the cover 34.

Herein, the supply unit 300 and the standby unit 400 further include micro adjusters 700, respectively.

The micro adjuster 700 is provided to adjust the protruding length of the pin tip portions 324 and 424 depending on the height of the cover 34 of the blood collection tube 30.

In accordance with one exemplary embodiment, the micro adjusters 700 may be installed in the pin bodies 322 and 422 and include any one of a cylinder or a driver motor for finely moving the pin tip portions 324 and 424, respectively.

Further, the standby pin 420 is vertically moved up and down, and the supply pin 320 is moved up and down in a state inclined toward a rear lower side, so that the blood collection tube 30 can be easily interrupted.

Further, the operation unit 500 is provided to select the type and the number of the blood collection tubes 30 held in the holding unit 100 at the time of operation.

Herein, the operation unit 500 may include a touch screen, and may select a type and the number of the blood collection tubes 30 while visually confirming the operation state.

Of course, information on the blood collection tubes 30 is stored in a database (not shown) of an institution, and the operation unit 500 is operated in association with the database.

Further, as illustrated in FIG. 7, the discharge unit 200 includes discharge frames 210, a discharge hole 220, and guide blocks 230.

The discharge frames 210 have a discharge space 202 formed therein and are fixed to one end portion of the holding frame 120.

Further, the discharge hole 220 is formed at a center of a bottom of the discharge space 202 for supplying the blood collection tube 30 to the labeling machine 20.

A pair of guide blocks 230 are provided on both sides of the discharge hole 220 to guide the blood collection tube 30 supplied by the supply unit 300 to the discharge hole 220, respectively.

The above-described discharge frame 210 may include discharge panels 212, a discharge door 214, and door latches 216, as illustrated in FIG. 8.

A pair of discharge panels 212 are respectively disposed at one end portions of the pair of holding frames 120 to form the discharge space 202 therein.

Further, the discharge door 214 is provided between the pair of discharge panels 212 to open and close the discharge space 202 forward.

The door latches 216 are provided to open and close the discharge door 214 at the pair of discharge panels 212.

Herein, the discharge door 214 is made of a transparent material, such that it is possible to see the discharge space 202 from an outside.

The above-described discharge door 214 further includes a door grip 2142 penetrated in a middle of the upper end portion thereof.

Further, the door latch 216 has a latch protrusion 2162, a through hole 2164, and a latch hole 2166.

The latch protrusion 2162 protrudes from a front surface of each guide block 230 and the through hole 2164 is formed in the discharge door 214 at a position corresponding thereto so that the latch protrusion 2162 passes therethrough.

The latch hole 2166 is formed on the upper side of the through hole 2164 so that the latch protrusion 2162 passed through the through hole 2164 is engaged to fix the discharge door 214 to the pair of discharge panels 212. The latch hole 2166 has a diameter smaller than that of the through hole 2164.

The door latch 216 allows the discharge door 214 to be opened when necessary, and if a malfunction occurs, for example the discharged blood collection tube 30 is caught, it is possible to quickly process the same.

Further, the discharge panels 212 further include second supply holes 218 formed therein to manually supply the medical sample tube.

The second supply hole 218 allows the medical sample tube, mainly the blood collection tube 30, to be directly supplied to the discharge unit 200 without passing through the holding unit 100, the supply unit 300 and the standby unit 400.

DESCRIPTION OF REFERENCE NUMERALS

10: Feeder
30, 30', 30": Blood collection tube
100: Holding unit
200: Discharge unit
300: Supply unit
400: Standby unit
500: Operation unit
600: Controller

What is claimed is:

1. An apparatus of automatically supplying a plurality of blood collection tubes for a labeling machine, wherein each of the blood collection tubes includes: a body in which collected blood is accommodated; a cover which has a diameter larger than that of the body and includes an opening formed in a portion thereof; and a plug made of an elastic material, which is disposed between the body and the cover so as to be exposed through the opening and close the body, the apparatus comprising:
  a holding unit comprising a plurality of holding grooves in which the body of each blood collection tube is inserted and a lower end of the cover is supported, and supply grooves formed at front ends of the holding grooves in a size to allow the cover of the blood collection tube to pass therethrough, wherein an upper portion of the holding unit is formed to be inclined downward from a rear toward a front, such that the blood collection tubes held in the holding grooves are moved forward by their own weight;
  a discharge unit configured to supply the blood collection tubes which are moved through the supply holes formed at the front ends of the holding grooves of the holding unit to the labeling machine;
  a supply unit having supply pins and configured to maintain positions of the blood collection tubes held at a forefront of each holding groove or release the stationary blood collection tubes, thus to selectively transfer the blood collection tube to the discharge unit;
  a standby unit having stop pins inserted into the openings of the blood collection tubes and configured to control movements of blood collection tubes positioned next to the foremost blood collection tubes held by the supply unit;
  an operation unit configured to select a type and a number of blood collection tubes held in the holding unit at the time of operation; and
  a controller configured to receive a signal from the operation unit and control the supply unit and the standby unit, thus to sequentially transfer one or more blood collection tubes for labeling to the discharge unit.

2. The apparatus according to claim 1, wherein the label machine includes both side plates disposed at an interval and an upper plate slidably mounted on upper portions of the side plates so as to open and close an inside thereof, and the holding unit is mounted on the upper plate of the label machine to slide therewith, so as to prevent a front end portion thereof having the discharge unit, the supply unit, and the standby unit mounted thereon from being removed from the labeling machine.

3. The apparatus according to claim 1, wherein the supply unit comprises:
  a supply frame;
  the supply pin installed in the supply frame so as to be moved toward the supply hole of the holding unit or away therefrom;
  a first supply actuator configured to move the supply pin toward the supply hole of the holding unit; and
  a second supply actuator provided in the supply frame to move the supply pin away from the supply hole of the holding unit,
  wherein the supply pin is moved toward the supply hole by the first supply actuator to prevent the blood collection tube held at the forefront of the holding groove from being moved to the supply hole, and
  the supply pin is moved away from the supply hole by the second supply actuator to allow the blood collection tube held at the forefront of the holding groove to be moved to the discharge unit through the supply hole.

4. The apparatus according to claim 3, wherein the standby unit comprises:
  a standby frame;
  a standby pin provided in the standby frame so as to be inserted into an opening formed in a cover of a blood collection tube positioned next to the foremost blood collection tube of the holding groove, thus to limit a movement thereof;
  a first standby actuator configured to move the standby pin toward the holding groove of the holding unit; and
  a second standby actuator provided in the standby frame to move the standby pin away from the holding groove of the holding unit,
  wherein the standby pin is moved toward the holding groove first standby actuator to be inserted into the opening of the cover of the blood collection tube positioned next to the foremost blood collection tube of the holding groove, thus to limit a movement thereof, and
  the standby pin is moved away from the holding groove by the second standby actuator to allow the blood collection tube positioned next to the foremost blood collection tube of the holding groove to be moved to the forefront of the holding groove.

5. The apparatus according to claim 4, wherein each of the second supply actuator and the second standby actuator comprises:
  a solenoid disposed in the frame with an inner space formed therein and having coils wound around an outer periphery thereof to form a magnetic field by power applied to the coil;
  a drive rod which is located in the inner space of the solenoid so that a lower end portion thereof is connected to an upper end portion of the pin and an upper end portion thereof protrudes to an upper side of the frame, and is moved upward by the magnetic field to move the pin upward; and
  a second stopper provided in the frame to limit a moving distance of the pin moved along the drive rod.

6. The apparatus according to claim 5, wherein each of the first supply actuator and the first standby actuator comprises:
  a first flange extending form an outer periphery of the pin protruding outwardly below the frame;

a first spring having elasticity and provided between the first flange and the frame to press the first flange downward, so as to move the pin downward; and a first stopper provided at an upper end of the drive rod so as to limit a moving distance of the pin moved by the first spring.

7. The apparatus according to claim 6, wherein each pin comprises:

a pin body having an insertion hole therein, an upper end portion connected to the drive rod, and the first flange formed on the outer periphery thereof; and a pin tip portion located in the insertion hole of the pin body.

8. The apparatus according to claim 7, each of the supply unit and the standby unit further comprises a micro adjuster configured to adjust a protruding length of the pin depending on the height of the cover of the blood collection tube.

9. The apparatus according to claim 8, wherein the micro adjuster comprises any one of a cylinder and a motor provided on the pin body to move the pin.

10. The apparatus according to claim 4, wherein the standby pin is vertically moved up and down, and the supply pin is moved up and down in a state inclined toward a rear lower side.

* * * * *